(12) United States Patent
Kasperchik et al.

(10) Patent No.: US 7,060,654 B2
(45) Date of Patent: *Jun. 13, 2006

(54) IMAGING MEDIA AND MATERIALS USED THEREIN

(75) Inventors: Vladek P Kasperchik, Corvallis, OR (US); Makarand P. Gore, Corvallis, OR (US); Marshall Field, Corvallis, OR (US); Jayprakash Bhatt, Corvallis, OR (US)

(73) Assignee: Hewlett-Packard Development Company, Houston, TX (US)

( * ) Notice: Subject to any disclaimer, the term of this patent is extended or adjusted under 35 U.S.C. 154(b) by 68 days.

This patent is subject to a terminal disclaimer.

(21) Appl. No.: 10/695,718

(22) Filed: Oct. 28, 2003

(65) Prior Publication Data

US 2005/0089782 A1  Apr. 28, 2005

(51) Int. Cl.
*B41M 5/30* (2006.01)
(52) U.S. Cl. ............ 503/208; 106/31.16; 106/31.17; 106/31.18; 106/31.19; 106/32.2; 106/31.22; 427/151; 427/150; 503/209; 503/216; 503/221
(58) Field of Classification Search ........ 503/200–226; 106/31.16–31.22; 427/150, 151
See application file for complete search history.

(56) References Cited

U.S. PATENT DOCUMENTS

| | | | |
|---|---|---|---|
| 3,658,543 A | 4/1972 | Gerlach, Jr. et al. | |
| 4,343,885 A | 8/1982 | Reardon, Jr. | |
| 5,434,119 A | 7/1995 | Satake et al. | |
| 5,646,088 A | 7/1997 | Hada et al. | |
| 5,810,397 A * | 9/1998 | Mehta et al. | ........... 283/114 |
| 5,824,715 A | 10/1998 | Hayashihara et al. | |
| 6,075,223 A | 6/2000 | Harrison | |
| 6,251,571 B1 | 6/2001 | Dessauer et al. | |
| 6,313,436 B1 | 11/2001 | Harrison | |
| 6,432,610 B1 | 8/2002 | Rentzepis et al. | |
| 6,670,037 B1 | 12/2003 | Okura et al. | |
| 6,720,043 B1 | 4/2004 | Sismondi et al. | |
| 6,720,124 B1 | 4/2004 | Takashima et al. | |
| 6,805,929 B1 | 10/2004 | Koga et al. | |
| 2003/0108708 A1 | 6/2003 | Anderson et al. | |
| 2004/0146812 A1 | 7/2004 | Gore et al. | |

FOREIGN PATENT DOCUMENTS

| | | |
|---|---|---|
| EP | 0 384 665 | 8/1990 |
| EP | 0716135 B1 | 9/1999 |
| EP | 1 371 697 A2 | 12/2003 |
| EP | 1 388 609 A1 | 2/2004 |
| WO | WO 02/078967 A1 | 10/2002 |
| WO | WO 03/032299 A2 | 4/2003 |
| WO | WO 2004/067289 | 8/2004 |

* cited by examiner

*Primary Examiner*—Bruce H. Hess (57) ABSTRACT

A coating includes an antenna uniformly distributed in both a matrix and a leuco-dye phase of the coating. A method for preparing an imaging material includes providing a powder having an activator and an antenna, dissolving the activator/antenna powder to form an activator/matrix pre-polymer solution, providing a leuco-dye alloy, and dispersing the leuco-dye alloy into the activator/matrix pre-polymer solution to form a radiation-curable paste. An image-recording medium includes a matrix having an antenna and an activator, and an alloy dispersed in the matrix as an independent phase. The alloy includes an antenna, a leuco-dye, and an accelerator.

22 Claims, 1 Drawing Sheet

IMAGING MEDIA AND MATERIALS USED THEREIN

BACKGROUND

Materials that produce color change upon stimulation with energy such as light or heat may have possible applications in imaging. For example, such materials may be found in thermal printing papers and instant imaging films. Generally, known materials and compositions may require a multilayer and/or multiphase film structure and further processing to produce an image (e.g., instant imaging films such as Polaroid). In the case of facsimile and thermal head media, high-energy input of greater than 1 $J/cm^2$ is needed to achieve good images. The compositions in multilayer/multiphase media may require control of diffusion of color-forming chemistry and further processing, and are found in separate phases and layers. Most thermal and facsimile paper coatings consist of coatings prepared by preparing fine dispersions of more than two components. The components mix and react upon application of energy, resulting in a colored material. In order to accomplish the necessary mixing, the particles need to contact across three or more phases or layers and merge into a new phase. Because of these multiple phases and layers, high energy is required to perform this process. For example, a relatively powerful carbon dioxide laser with an energy density of 3 $J/cm^2$ at exposure times of much greater than 100 µs may be needed to produce a mark. In some instances, this high-energy application may cause damage to the imaging substrate. In many situations, it may be desirable to produce a visible mark more efficiently using either a less intense, less powerful, and/or shorter energy application.

Alternatively, marking composition for forming clear-cut marks on the surface of a molded article by laser beam irradiation can employed. The coating color-forming chemistry typically comprises a leuco-dye and phenolic developer (activator) (both of which have low solubility) dispersed as separate phases in radiation-curable polymer matrix or solvent/water-borne coating. The coating also includes an Antenna, which is a chemical species having a high extinction coefficient absorption band corresponding to an imaging laser wavelength. However, the Antenna is present in only one of the separate phases, which does not result in very efficient absorbance of laser radiation. As a result, the energy density required to mark this coating is relatively high (>0.5 $J/cm_2$, and usually about 3 $J/cm_2$). Use of such energy densities can result in the coating and/or the substrate under the coating being ablated or damaged. Use of such imageable coating requiring high energy densities can further complicate the use of such coatings for labeling of temperature or energy sensitive data carriers (recordable CDs, DVDs etc.). In view of the foregoing, there is a need for fast-marking coatings and color-forming materials, initiated and addressable by low-energy radiation.

SUMMARY

The present invention relates to an imaging compound: a matrix having an antenna and an activator; and an alloy dispersed in said matrix as an independent phase, said alloy having an antenna and further having a leuco-dye and an accelerator uniformly distributed in the alloy.

Another aspect of the invention includes a method for preparing an imaging material. The method includes providing a powder having an activator and an antenna, dissolving the activator/antenna powder to form an activator/matrix pre-polymer solution, providing a leuco-dye alloy, and dispersing the leuco-dye alloy into the activator/matrix pre-polymer solution to form a radiation-curable paste.

Another aspect of the invention includes an image-recording medium that includes a substrate, a matrix on the substrate, the matrix having an antenna and an activator, and an alloy dispersed in the matrix as an independent phase, the alloy having an antenna and further having a leuco-dye and an accelerator uniformly distributed in the alloy.

BRIEF DESCRIPTION OF THE DRAWINGS

While the specification concludes with claims particularly pointing out and distinctly claiming that which is regarded as the present invention, the present invention can be more readily ascertained from the following description of the invention when read in conjunction with the accompanying drawings in which:

DETAILED DESCRIPTION

The present invention includes coatings that result in clear marks and excellent image quality when marked with any suitable energy source such as, for example, IR radiation, UV radiation, or visible light. The materials used to produce color change upon stimulation by energy may include a color-former such as a leuco-dye and an activator dispersed in a matrix (such as radiation-cured acrylate oligomers and monomers) that is applied to a substrate. In particular embodiments, either the leuco-dye or the activator may be substantially insoluble in the matrix at ambient conditions. An efficient radiation energy absorber that functions to absorb energy and deliver it to the reactants is also present in the coating. Energy may then be applied, which results in either the activator, the color-former, or both, becoming heated and mixed, causing the leuco-dye to become activated and a mark to be produced.

As used herein, the term "leuco-dye" means a color-forming substance which is colorless or of a first color in a nonactivated state, and subsequently exhibits color or changes from the first color to a second color in an activated state. As used herein, the term "activator" is a substance, which reacts with a leuco-dye and causing the leuco-dye to alter its chemical structure and change or acquire color. By way of example only, activators may be phenolic or other proton-donating species that can effect this change. The term "antenna" means any radiation-absorbing compound. The antenna readily absorbs a desired specific wavelength of the marking radiation.

A particular embodiment of the coating of the present invention includes a radiation-curable polymer matrix, such as, for example, a matrix based on UV-curable pre-polymers. An antenna is uniformly distributed or dissolved in the matrix. As used herein, the term Antenna includes any compound that effectively absorbs radiation from an imaging laser. In one particular embodiment, the Antenna is an infrared (IR) Dye. Examples of Antennas include but are not limited to IR780 (Aldrich 42,531-1), IR783 (Aldrich 54,329-2), Syntec 9/1, Syntec 9/3, or metal complexes (such as dithiolane metal complexes and indoaniline metal complexes). Also dissolved in the matrix is an acidic (proton-donating) activator (e.g., developer). The coating also includes an alloy (amorphous eutectic or polycrystalline)

including a leuco-dye, an accelerator (preferably a low-melting aromatic compound), and an Antenna. Leuco-dyes used in a particular embodiment of the invention are fluoran-based compounds. The presence of the accelerator assists in reducing the melting temperature of high-melting fluoran dyes and, thus, provides improved reactivity upon heating. Use of an accelerator also facilitates uniform dissolution of the Antenna in the leuco-dye alloy. The coating comprises two separate phases. The first phase includes the radiation-curable polymer matrix having the acidic activator dissolved in the polymer matrix. The second phase includes the low-melting eutectic of a leuco-dye that is either insoluble or which has relatively low solubility (such as, for example less than 5% solubility or, most preferably, less than 2%) in the matrix, but that is uniformly distributed in the matrix as a fine dispersion.

Another embodiment of the invention includes a method of preparing the radiation-curable imageable coating. The method includes preparation of an activator/Antenna alloy. Activator is heated until melting and Antenna is dissolved in the melt. Optionally, Antenna could be pre-dissolved in a smaller amount of the low melting organic solvent (Melting Aid) with subsequent addition and melting of the Activator. The hot melt is cooled down to ambient temperature and ground to smaller particle size (typically below about 20 to about 50 µm). In one particular embodiment, the Activator includes an acidic (proton-donating) compound having a phenol group. Suitable activators for use with the present invention include any acidic compound such as, for example, Bis-Phenol A, p-Hydroxy Benzyl Benzoate, TG-SA (Phenol, 4,4'-sulfonylbis[2-(2-propenyl)], and poly-phenols. Suitable Activators for use with the invention should have good solubility with Antenna.

Optionally, a melting aid may be added to the coating to lower the melting temperature of crystalline organic substances in the coating to a range of from about 50° C. to about 120° C. Suitable melting aids for use in the present invention include any compounds that act as a good solvent for both the activator and the Antenna. Examples of melting aids include, but are not limited to, m-tolyl ether of ethylene glycol, dibenzyl oxalate, and dibenzyl terephthalate.

The activator/matrix pre-polymer solution is then prepared by dissolving the ground activator/Antenna alloy in a pre-polymer solution of the UV-curable matrix. The content of activator/Antenna alloy in the pre-polymer solution may be in the range of from about 2 wt. % to about 90 wt. % (based on total weight of the pre-polymer solution), desirably from about 3 wt. % to about 60 wt. %, and most desirably from 5 to 45 wt. %. The ground activator/Antenna alloy should be dissolved in pre-polymer phase such that the components are uniformly and homogeneously distributed in the liquid phase. Preparation of the activator/Antenna alloy provides improved dissolution of the Antenna in the liquid pre-polymer. This is particularly useful as many conventional IR dyes have low dissolution in high viscosity pre-polymers. Dissolution of the Antenna in the activator melt with subsequent dissolution of the melt in the pre-polymer enables uniform/homogeneous distribution of Antenna in the matrix and improves sensitivity of the Antenna to radiation of the imaging laser.

The leuco-dye alloy (eutectic) is prepared by dissolving the Antenna in the accelerator melt. Leuco-dye is then dissolved in the accelerator melt, which results in the formation of a leuco-dye/accelerator/antenna alloy which is cooled down and ground to a fine powder, preferably having a particle size of not larger than about 20 µm, and more preferably of less than 10 µm. The leuco-dye used in the one particular embodiment of the invention is of a fluoran type. Examples of acceptable fluoran leuco-dyes suitable for use with the present invention include structures having the formula:

where R could be alkyl or aryl groups or H atoms.

Accelerators used in the current invention include crystalline organic solids with melting temperatures in the range of about 50° C. to about 150° C., and preferably having melting temperature in the range of about 70° C. to about 120° C. Suitable accelerators include aromatic hydrocarbons (or their derivatives) that provide good solvent characteristics for leuco-dye and antennas used in the formulations and methods of the present invention. In addition to dissolving leuco-dye and antennas, the accelerator may also assist in reducing the melting temperature of the leuco-dye and stabilize the leuco-dye alloy in the amorphous state (or slow down the recrystallization of the leuco-dye alloy into individual components). Suitable accelerators for use in the current invention include, but are not limited to, m-terphenyl, p-benzyl biphenyl, β-naphtol benzylether, 1,2-bis(3,4-dimethylphenyl)ethane.

A thermochromic, UV-curable paste is prepared by dispersing the powder of sensitized leuco-dye alloy in the solution of activator/antenna alloy in the radiation-curable pre-polymer (lacquer). The radiation-curable prepolymer acts as a solvent for the activator/antenna alloy and as dispersing media for the leuco-dye alloy. The leuco-dye alloy, being poorly soluble in the activator/laquer solution, exists in the mixture mostly as a separate phase. Suitable radiation-curable pre-polymers (laquers) may include, by way of example, UV-curable matrices such as acrylate derivatives, oligomers and monomers, with a photo package. A photo package may include a light absorbing species which initiate reactions for curing of a lacquer, such as, by way of example, benzophenone derivatives. Other examples of photoinitiators for free radical polymerization monomers and pre-polymers include but are not limited to thioxanethone derivatives, anthraquinone derivatives, acetophenones and benzoine ethers. In particular embodiments of the invention, it may be desirable to choose a matrix which is cured by a form of radiation that does not cause a color change. Matrices based on cationic polymerization resins may require photoinitiators based on aromatic diazonium salts, aromatic halonium salts, aromatic sulfonium salts and metallocene compounds. A suitable lacquer or matrix may also include Nor-Cote CDG000 (a mixture of UV curable acrylate monomers and oligomers) which contains a photoinitiator (hydroxy ketone) and organic solvent acrylates (e.g., methyl methacrylate, hexyl methacrylate, beta-phenoxy ethyl acrylate, and hexamethylene acrylate). Other suitable components for lacquers or matrices may include, but are not limited to, acrylated polyester oligomers, such as CN293 and CN294 as well as CN-292 (low viscosity polyester acrylate oligomer), SR-351 (trimethylolpropane triacrylate), SR-395(isodecyl acrylate) and SR-256(2(2-ethoxyethoxy) ethyl acrylate) (all of which are available from Sartomer Co.).

The thermochromic, UV-curable paste is printed on the substrate with subsequent radiation exposure to cure the coating. Selection of suitable photopackages for use in the radiation-curable lacquer should be made so that the activation wavelength of the photopackage is not significantly blocked by other species present in the coating. The cured coating is imageable by laser with emission wavelength tuned to the antenna absorption. Thus, the coating absorbs laser energy efficiently (i.e. at energy density levels as low as 0.1–0.5 J/cm$^2$).

Figure 2:
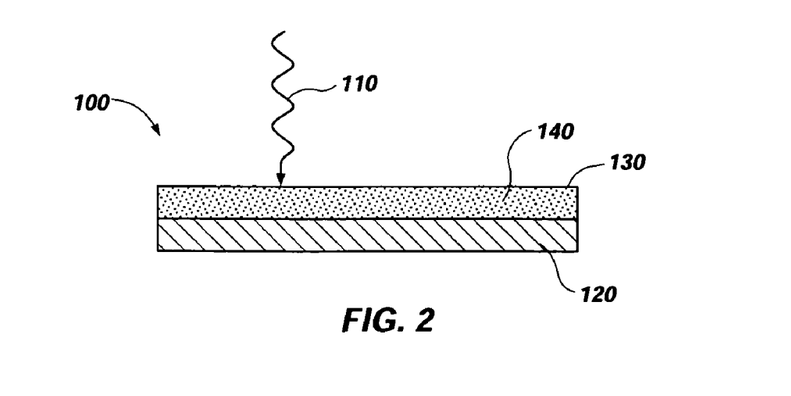
FIG. 2 shows an imaging medium according to an embodiment of the present invention.

Referring now to the embodiments illustrated in FIG. 2, there is shown imaging medium 100, energy 110, substrate 120, imaging composition 130, and suspended particles 140. Imaging medium 100 may comprise a substrate 120. Substrate 120 may be any substrate upon which it is desirable to make a mark, such as, by way of example only, paper (e.g., labels, tickets, receipts, or stationary), overhead transparencies, or the labeling surface of a medium such as a CD-R/RW/ROM or DVD-R/RW/ROM.

Imaging composition 130 may comprise a matrix, an activator, and a radiation-absorbing compound such as an Antenna. The activator and the antenna are soluble in the matrix. The formed accelerator/leuco-dye/antenna (90 of FIG. 1) alloy may be substantially insoluble in the matrix and may be suspended or dispersed in the matrix as uniformly distributed particles 140. The imaging composition 130 (including the activator and the antenna) may be applied to the substrate via any acceptable method, such as, by way of example only, rolling, spraying, or screen printing.

Energy 110 may be directed to imaging medium 100 to form a marking or image. The form of energy may vary depending upon the equipment available, ambient conditions, and desired result. Examples of energy which may be used include IR radiation, UV radiation, x-rays, or visible light. The antenna may absorb the energy and heat the imaging composition 130. The heat may cause suspended particles 140 to reach a temperature sufficient to cause the inter-diffusion of the color-forming species (e.g., leuco-dye) initially present in the particles (e.g., glass transition temperatures ($T_g$) or melting temperatures ($T_m$) of particles 140 and matrix). The activator and dye may then react to form a color or, where the leuco-dye is already colored, to change the color of the same.

Examples 1 and 2 illustrate exemplary embodiments of the present invention. It is understood that several modifications may be made that are within the scope of the present invention. For example, antenna 60 suitable for use with the invention may be any material that effectively absorbs the type of energy to be applied to the imaging medium to effect a mark. By way of example only, the following compounds IR780 (Aldrich 42,531-1) (1), IR783 (Aldrich 54,329-2) (2), Syntec 9/1 (3), Syntec 9/3 (4) or metal complexes (such as dithiolane metal complexes (5) and indoaniline metal complexes (6)) may be suitable antennae:

(1)

(2)

(3)

(4)

(5)

where $M_1$ is a transition metal, $R_1$, $R_2$, $R_3$, and $R_4$ are alkyl or aryl groups with or without halo substituents, and $A_1$, $A_2$, $A_3$, and $A_4$ can be S, NH, or Se;

(6)

where $M_2$ is Ni or Cu and $R_5$ and $R_6$ are aryl or alkyl groups with or without halo substituents.

Additional examples of suitable antenna include quinone, phthalocyanine, naphthalocyanine, metal complexes, azo, croconium, squarilium dyes, and hexafunctional polyester oligomers. Other examples of antenna can be found in "Infrared Absorbing Dyes," Matsuoka, Masaru, ed., Plenum Press (1990) (ISBN 0-306-43478-4) and "Near-infrared Dyes for High Technology Applications," Daehne, S.; Resch-Genger, U.; Wolfbeis, O. Ed., Kluwer Academic Publishers (ISBN 0-7923-5101-0), both incorporated herein by reference.

The activator (e.g., bisphenol-A) and leuco-dye 90 (e.g., BK-400) may act in tandem to produce a mark. The activator and leuco-dye may be any two substances which, when reacted together, produce a color change. When reacted, the activator may initiate a color change in the leuco-dye (i.e. develop the leuco-dye). The leuco-dye may have low solubility in the matrix at ambient temperature, but the solubility can increase significantly when the matrix is heated above the melting temperatures of the leuco-dye alloy and the matrix. Thus, upon heating, the leuco-dye may dissolve in the matrix. Because there is activator dissolved in the matrix, both leuco-dye and activator end up in the same phase (matrix), thus reacting with one another and producing color. Rapid cooling after imaging stabilizes the colored leuco-dye/activator complex dissolved in the matrix. In contrast, the formed leuco-dye/accelerator/antenna alloy may be substantially insoluble in the lacquer at ambient conditions. By "substantially insoluble," it is meant that the solubility of the leuco-dye in the lacquer at ambient conditions is so low, that no or very little color change may occur due to reaction of the dye and the activator at ambient conditions. Thus, in the embodiments described above, the activator is dissolved in the lacquer and the leuco-dye/accelerator/antenna alloy remains suspended or dispersed as a solid in the matrix at ambient conditions. Activators may include, without limitation, proton donors and phenolic compounds such as bisphenol-A and bisphenol-S. Leuco-dyes may include fluoran leuco-dyes.

Leuco-dyes suitable for use in the present invention include, but are not limited to, fluorans, phthalides, aminotriarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids (cyanoethanes, leuco methines) and corresponding esters, 2(p-hydroxyphenyl)-4,5-diphenylimidazoles, indanones, leuco indamines, hydrozines, leuco indigoid dyes, amino-2,3-dihydroanthraquinones, tetrahalo-p,p'-biphenols, 2(p-hydroxyphenyl)-4,5-diphenylimidazoles, phenethylanilines, and mixtures thereof. In one aspect of the present invention, the leuco dye can be a fluoran, phthalide, aminotriarylmethane, or mixture thereof. Several non-limiting examples of suitable fluoran based leuco dyes include 3-diethylamino-6-methyl-7-anilinofluorane, 3-(N-ethyl-p-toluidino)-6-methyl-7-anilinofluorane, 3-(N-ethyl-N-isoamylamino)-6-methyl-7-anilinofluorane, 3-diethylamino-6-methyl-7-(o,p-dimethylanilino) fluorane, 3-pyrrolidino-6-methyl-7-anilinofluorane, 3-piperidino-6-methyl-7-anilinofluorane, 3-(N-cyclohexyl-N-methylamino)-6-methyl-7-anilinofluorane, 3-diethylamino-7-(m-trifluoromethylanilino)fluorane, 3-dibutylamino-6-methyl-7-anilinofluorane, 3-diethylamino-6-chloro-7-anilinofluorane, 3-dibutylamino-7-(o-chloroanilino)fluorane, 3-diethylamino-7-(o-chloroanilino) fluorane, 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofuranone,4,5,6,7-tetrachloro-3,3-bis[2-[4-(dimethylamino)phenyl]-2-(4-methoxyphenyl)ethenyl], and mixtures thereof. Aminotriarylmethane leuco dyes can also be used in the present invention such as tris(N,N-dimethylaminophenyl) methane (LCV); deutero-tris(N, N-dimethylaminophenyl) methane (D-LCV); tris(N,N-diethylaminophenyl) methane (LECV); deutero-tris(4-diethylaminolphenyl) methane (D-LECV); tris(N,N-di-n-propylaminophenyl) methane (LPCV); tris(N,N-di-n-butylaminophenyl) methane (LBCV); bis(4-diethylaminophenyl)-(4-diethylamino-2-methyl-phenyl) methane (LV-1); bis(4-diethylamino-2-methylphenyl)-(4-diethylamino-phenyl) methane (LV-2); tris(4-diethylamino-2-methylphenyl) methane (LV-3); deutero-bis (4-diethylaminophenyl)-(4-diethylamino-2-methylphenyl) methane (D-LV-1); deutero-bis(4-diethylamino-2-methylphenyl)(4-diethylaminophenyl) methane (D-LV-2); bis(4-diethylamino-2-methylphenyl)(3,4-dimethoxyphenyl) methane (LB-8); aminotriarylmethane leuco-dyes having different alkyl substituents bonded to the amino moieties wherein each alkyl group is independently selected from C1–C4 alkyl; and aminotriaryl methane leuco-dyes with any of the preceding named structures that are further substituted with one or more alkyl groups on the aryl rings wherein the latter alkyl groups are independently selected from C1–C3 alkyl. Other leuco-dyes can also be used in connection with the present invention and are known to those skilled in the art. A more detailed discussion of some of these types of leuco-dyes may be found in U.S. Pat. Nos. 3,658,543 and 6,251,571, each of which are hereby incorporated by reference in their entireties. Examples of other suitable leuco-dyes for use with the invention can be found in Chemistry and Applications of Leuco Dyes, Muthyala,Ramaiha, ed.; Plenum Press, NewYork, London; ISBN: 0-306-45459-9, the contents of which are incorporated herein by reference.

Upon heat-induced oxidation, protonation, ring-opening, or the like, in the presence of the uninhibited metal complex activator and/or unprotected secondary activator, the above-recited leuco-dyes can form dyes having a variety of optical characteristics. Although a wide range of compositions are suitable for use in the present invention, the color forming composition can contain at least about 3% by weight of leuco-dye, and in more detail, can be present at a concentration of from about 4% to about 20% by weight. It is understood that these ranges are only exemplary and other weight ranges can be used depending on the desired image characteristics and other considerations.

Examples of acceptable fluoran leuco-dyes comprise the structure shown in Formula (7):

(7)

where R could be alkyl or aryl groups or H atoms.

Figure 1:
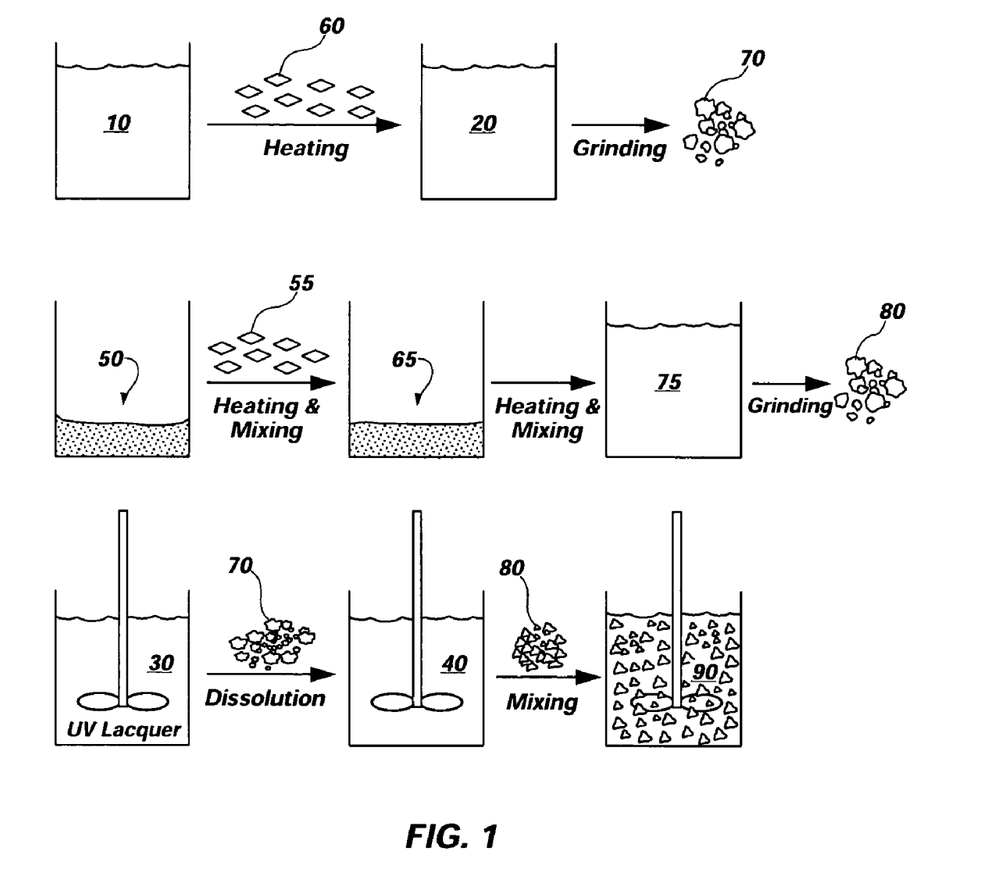
FIG. 1 shows a method of preparing an imaging material according to an embodiment of the present invention.

Lacquer 30 may be any suitable matrix for dissolving and/or dispersing the activator, antenna, and color former. Acceptable lacquers may include, by way of example only, UV curable matrices such as acrylate derivatives, oligomers and monomers, with a photo package. A photo package may include a light-absorbing species which initiates reactions for curing of a lacquer, such as, by way of example, benzophenone derivatives. Other examples of photoinitiators for free radical polymerization monomers and pre-polymers include but are not limited to: thioxanethone derivatives, anthraquinone derivatives, acetophenones and benzoine ether types. It may be desirable to choose a matrix that is cured by a form of radiation other than the type of radiation which causes a color change. Matrices based on cationic polymerization resins may require photoinitiators based on aromatic diazonium salts, aromatic halonium salts, aromatic sulfonium salts and metallocene compounds. An example of an acceptable lacquer or matrix may include Nor-Cote CDG000 (a mixture of UV curable acrylate monomers and oligomers) which contains a photoinitiator (hydroxy ketone) and organic solvent acrylates (e.g., methyl methacrylate, hexyl methacrylate, beta-phenoxy ethyl acrylate, and hexamethylene acrylate). Other acceptable lacquers or matrices may include acrylated polyester oligomers such as CN293 and CN294 available from Sartomer Co.

EXAMPLES

The following examples illustrate particular methods for preparing an imaging solution in accordance with embodiments of the present invention. The following examples should not be considered as limitations of the present invention, but should be viewed as representative known embodiments and tests of the print medium based upon current experimental data.

Example I

Referring to the embodiments of FIG. 1, which shows a method for preparing an imaging solution in accordance with embodiments of the present invention, the method may comprise an activator melt 10, an activator/antenna solution 20, a UV curable lacquer solution 30, a lacquer/antenna/activator solution 40, and a two phase UV curable paste 50. In the embodiments illustrated in FIG. 1, 2 grams of dibenzyl oxalate was heated to melting (about 85° C). 20 grams of activator bisphenol-A and one gram of antenna IR780 were dissolved in the melted dibenzyl oxalate. The activator/antenna solution 20 was cooled and ground into a fine powder 70.

Five grams of the ground activator/antenna powder 70 was dissolved in 15.3 g Nor-Cote CDG000 UV-lacquer 30 (a mixture of UV-curable acrylate monomers and oligomers) to form the lacquer/antenna/activator solution 40.

Ten grams of m-Terphenyl (accelerator) 50 was melted in a beaker. The melt 50 was heated to 110° F. 100 grams of BK400 55 was added in small increments to the melt upon constant stirring. The added BK-400 is a leuco-dye (2'-anilino-3'-methyl-6'-(dibutylamino)fluoran) available from Nagase Corporation, the structure of which is set forth below as Formula 8:

(average particle size less than about 5 μm). The temperature of the mixture was increased up to 170–180° C. Stirring was continued until complete dissolution of BK400 in the melt (usually takes 10–15 min) was obtained to form an accelerator/leuco-dye solution 65. 550 mg of IR780 (IR dye) 70 was added to the melt upon constant stirring. IR780 iodide has the following formula:

Heating and stirring was continued for about two to three additional minutes until the IR dye was completely dissolved in the melt to form a leuco-dye/antenna/accelerator alloy (eutectic) 75. Temperature of the leuco-dye/antenna/accelerator alloy 75 was kept to below about 190° C.

The leuco-dye/antenna/accelerator alloy 75 was then poured into a pre-cooled freezer tray lined with aluminum foil. Solidified melt was milled into a coarse powder and then attrition-ground in the aqueous dispersion until the average particle size of the ground alloy was less than about 4 μm. The ground alloy was dried in a vacuum to form a leuco-dye eutectic powder 80.

The mixture of leuco-dye/antenna/accelerator alloy 75 and lacquer/antenna/activator solution 40 was formed into a UV-curable paste 90 and screen printed onto a substrate at a thickness of approximately about 5 to about 7 μm to form an imaging medium (not shown). The coating on the medium was then UV cured by mercury lamp.

Direct marking was effected on the resulting coated substrate with a 45 mW laser. A mark of approximately 20 μm×45 μm was produced with duration of energy applications of about 30 μsec to about 100 μsec. Direct marking occurs when the desired image is marked on the imaging medium, without the use of a printing intermediary.

Example II

The method of Example I was carried out, except that 20 grams of TG-SA (Phenol, 4,4'-sulfonylbis[2-(2-propenyl)]-(9CI)) (Formula (9)):

(9)

was used as the activator and 1.2 grams of antenna IR780 were dissolved in the melted dibenzyl oxalate to form the activator/antenna solution 20 which was cooled and ground into a fine powder 70. Additionally, instead of using 100 grams of BK400 as the leuco-dye 55, 15 grams of S-205 leuco-dye (2-anilino-3-methyl-6-(N-ethyl-N-isoamylamino) fluorane—available from "Nagase Co., Ltd") (Formula (10)):

(10)

(average particle size <5 μm) 90 was used to form the accelerator/leuco-dye solution 65. As with Example I, the mixture of leuco-dye/antenna/accelerator alloy 75 and lacquer/antenna/activator solution 40 was formed into a UV-curable paste 90 and screen printed onto a substrate at a thickness of approximately 7 μm to form an imaging medium (not shown). The coating on the medium was then UV cured by mercury lamp. Direct marking was effected on the resulting coated substrate with a 45 mW laser. A mark of approximately 20 μm×45 μm was produced with energy applications of about 60 μsec to 100 μsec.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention by the following appended claims.

What is claimed is:

1. An imaging composition comprising:
   a matrix having a first antenna and an activator; and
   an alloy dispersed in said matrix as an independent phase, said alloy having a second antenna and further having a leuco-dye and an accelerator uniformly distributed in the alloy,
      wherein each of the first antenna and the second antenna is independently selected from at least one compound selected from the group consisting of quinone, a metal complex, azo, croconium, a squarilium dye, a hexafunctional polyester oligomer, and a compound represented by one of the following formulas:

where $M_1$ is a transition metal, $R_1$, $R_2$, $R_3$, and $R_4$ are alkyl groups or aryl groups with or without halo substituents, and $A_1$, $A_2$, $A_3$, and $A_4$ are S, NH, or Se; and where $M_2$ is Ni or Cu and $R_5$ and $R_6$ are aryl groups or alkyl groups with or without halo substituents.

2. The imaging composition of claim 1, wherein the first antenna of the matrix and the second antenna of the alloy are different compounds.

3. The imaging composition of claim 1, wherein the leuco-dye comprises the following structure:

where R is an alkyl group, an aryl group, or a H atom.

4. The imaging composition of claim 1, wherein the activator comprises a phenolic compound.

5. The imaging composition of claim 1, wherein each of the first antenna and the second antenna is independently selected from at least one compound selected from the group consisting of where $M_1$ is a transition metal, $R_1$, $R_2$, $R_3$, and $R_4$ are alkyl groups or aryl groups with or without halo substituents, and $A_1$, $A_2$, $A_3$, and $A_4$ are S, NH, or Se; and where $M_2$ is Ni or Cu and $R_5$ and $R_6$ are aryl groups or alkyl groups with or without halo substituents.

6. The imaging composition of claim 1, wherein each of the first antenna and the second antenna is tuned to absorb laser radiation.

7. The imaging composition of claim 1, wherein each of the first antenna and the second antenna is tuned to absorb infrared radiation.

8. The imaging composition of claim 1, wherein the matrix comprises an ultraviolet-curable compound.

9. A method for preparing an imaging material, the method comprising:
providing a powder having an activator and an antenna, wherein the antenna comprises at least one compound selected from the group consisting of quinone, a metal complex, azo, croconium, a squarilium dye, a hexafunctional polyester oligomer, and a compound represented by one of the following formulas:

-continued where $M_1$ is a transition metal, $R_1$, $R_2$, $R_3$, and $R_4$ are alkyl groups or aryl groups with or without halo substituents, and $A_1$, $A_2$, $A_3$, and $A_4$ are S, NH, or Se; and where $M_2$ is Ni or Cu and $R_5$ and $R_6$ are aryl groups or alkyl groups with or without halo substituents;
dissolving the activator/antenna powder to form an activator/matrix pre-polymer solution;
providing a leuco-dye alloy; and
dispersing the leuco-dye alloy into the activator/matrix pre-polymer solution to form a radiation-curable paste.

10. The method of claim 9, further comprising applying the radiation-curable paste on a substrate.

11. The method of claim 9, wherein providing an activator/antenna powder comprises:
melting an activator;
dissolving an antenna in the activator to form an activator/antenna melt;
cooling the activator/antenna melt to ambient temperature; and
grinding the cooled activator/antenna melt to a powder.

12. The method of claim 11, wherein the cooled activator/antenna powder comprises particle sizes below 50 μm.

13. The method of claim 9, wherein providing a leuco-dye alloy comprises:
providing a melted accelerator;
dissolving an antenna into the melted accelerator;
dissolving leuco-dye into the melted accelerator;
cooling the leuco-dye/antenna/accelerator melt to a solid state; and
grinding the cooled leuco-dye/antenna/accelerator melt to a powder.

14. The method of claim 13, wherein the cooled leuco-dye/antenna/accelerator powder comprises particle sizes below 20 μm.

15. An image-recording medium comprising:
a substrate;
a matrix on the substrate, the matrix having a first antenna and an activator; and
an alloy dispersed in the matrix as an independent phase, the alloy having a second antenna and further having a leuco-dye and an accelerator distributed in the alloy,
wherein each of the first antenna and the second antenna is independently selected from at least one compound selected from the group consisting of quinone, a metal complex, azo, croconium, a squarilium dye, a hexafunctional polyester oligomer, and a compound represented by one of the following formulas:

where $M_1$ is a transition metal, $R_1$, $R_2$, $R_3$, and $R_4$ are alkyl groups or aryl groups with or without halo substituents, and $A_1$, $A_2$, $A_3$, and $A_4$ are S, NH, or Se; and where $M_2$ is Ni or Cu and $R_5$ and $R_6$ are aryl groups or alkyl groups with or without halo substituents.

16. The image-recording medium of claim 15, wherein the first antenna of the matrix and the second antenna of the alloy are different.

17. The image-recording medium of claim 15, wherein the leuco-dye comprises the following structure:

where R is an alkyl group, an aryl group, or a H atom.

18. The image-recording medium of claim 15, wherein the activator comprises a phenolic compound.

19. The image-recording medium of claim 15, wherein each of the first antenna and the second antenna is independently selected from at least one compound selected from the group consisting of -continued where $M_1$ is a transition metal, $R_1$, $R_2$, $R_3$, and $R_4$ are alkyl groups or aryl groups with or without halo substituents, and $A_1$, $A_2$, $A_3$, and $A_4$ are S, NH, or Se; and where $M_2$ is Ni or Cu and $R_5$ and $R_6$ are aryl groups or alkyl groups with or without halo substituents.

20. The image-recording medium of claim 15, wherein each of the first antenna and the second antenna is tuned to absorb laser radiation.

21. The image-recording medium of claim 15, wherein each of the first antenna and the second antenna is tuned to absorb infrared radiation.

22. The image-recording medium of claim 15, wherein the matrix comprises an ultraviolet-curable compound.

* * * * *